United States Patent [19]

Hoeschele

[11] 4,351,757
[45] Sep. 28, 1982

[54] MOLDING MATERIAL OF POLYETHYLENE TEREPHTHALATE AND ALKAI METAL SALT OF $C_{30}$-$C_{54}$ SUBSTANTIALLY ALIPHATIC CARBOXYLIC ACID

[75] Inventor: Guenther K. Hoeschele, Wilmington, Del.

[73] Assignee: E. I. Du Pont de Nemours and Company, Wilmington, Del.

[21] Appl. No.: 200,192

[22] Filed: Oct. 24, 1980

[51] Int. Cl.$^3$ .................... C08K 5/10; C08L 67/02
[52] U.S. Cl. .............................. 524/169; 524/170; 524/210; 524/230; 524/173; 524/292; 524/293; 524/296; 524/359; 524/205; 524/396; 524/513; 524/605
[58] Field of Search .............................. 260/31.8 XA

[56] References Cited

U.S. PATENT DOCUMENTS

| | | | |
|---|---|---|---|
| 3,516,957 | 6/1970 | Gray, Jr. et al. | 260/31.8 XA |
| 3,578,621 | 5/1971 | Stapfer | 260/31.8 XA |
| 3,639,527 | 2/1972 | Brinkmann et al. | 525/176 |
| 3,761,450 | 9/1973 | Herwig et al. | 260/31.8 XA |
| 4,229,332 | 10/1980 | Kyo et al. | 260/31.8 XA |

FOREIGN PATENT DOCUMENTS

| | | | |
|---|---|---|---|
| 2706128 | 8/1978 | Fed. Rep. of Germany | 260/31.8 XA |
| 2015014 | 1/1979 | United Kingdom | 260/31.8 XA |

Primary Examiner—William F. Hamrock
Assistant Examiner—Peter F. Kulkosky

[57] ABSTRACT

Use of a selected alkali metal salt of a polycarboxylic acid has been found to impart good crystallization and mold release properties to polyethylene terephthalate molding blends.

8 Claims, No Drawings

MOLDING MATERIAL OF POLYETHYLENE TEREPHTHALATE AND ALKAI METAL SALT OF C$_{30}$-C$_{54}$ SUBSTANTIALLY ALIPHATIC CARBOXYLIC ACID

FIELD OF THE INVENTION

This invention relates to polyethylene terephthalate molding materials, and more specifically to such materials that aid in crystallizing polyethylene terephthalate.

BACKGROUND OF THE INVENTION

It is desirable to mold polyethylene terephthalate resins to obtain molded articles that are well crystallized and have smooth, glossy surfaces. One way to obtain such articles is to use very high mold temperatures, e.g., above 130° C. Another way is use a crystallization-rate-increasing system, such as is described in published British application No. 2,015,014A. However, new systems for improving the crystallization rate of polyethylene terephthalate molding resins are continually being sought.

Moreover, with most polyethylene terephthalate molding resins, difficulties are encountered when articles molded from the resins are removed from the mold. Specifically, the articles tend to stick in the mold. This sticking problem is most apparent when thin, high surface area articles are molded. Because of their thinness, the effort (as exerted by knock out pins) required to remove the article from the mold can badly deform the article. An additive to reduce such sticking tendencies, i.e., a mold release agent, is desirable; however, the additive should not decrease strength properties, such as impact strength.

SUMMARY OF THE INVENTION

It is the purpose of this invention to provide unreinforced, filled or reinforced polyethylene terephthate molding blends that can be molded into articles having a smooth, glossy surface, and having mold release properties.

It has been found that the crystallization of polyethylene terephthalate resins is increased when an alkali metal salt of a substantially aliphatic polycarboxylic acid containing at least 26 carbon atoms, and preferably 30 to 54 carbon atoms, and having a molecular weight of less than about 1500, is added to the resins. It has also been found that with many polyethylene terephthalate resins, better release from molds is obtained.

Accordingly, this invention, in its broadest aspect is a molding blend comprising (a) polyethylene terephthalate which can contain up to 10% by weight of a nonpolymeric comonomer or up to 3% by weight of a polymeric comonomer, and which has an inherent viscosity of at least 0.4 dl/g; and (b) about 0.1-5%, based on polyethylene terephthalate, of an alkali metal salt of a substantially aliphatic polycarboxylic acid containing at least 26 carbon atoms and having a molecular weight of less than about 1500, provided the amount of salt present is sufficient to provide a $\Delta H_H/\Delta H_c$ ratio of less than 0.25 to the blend.

The molding blend preferably can contain additional components, such as:

(c) up to 60% by weight of blend of a reinforcing and/or filling material, or (d) up to 12% by weight of blend of a sodium or potassium salt of an ionic hydrocarbon copolymer of an α-olefin of 2-5 carbon atoms and an α,β-ethylenically unsaturated carboxylic acid of 3-5 carbon atoms in which the carboxyl groups have been at least partially neutralized with Na$^+$ or K$^+$ cations, provided the amount of both copolymer and the alkali metal salt of the substantially aliphatic polycarboxylic acid present is sufficient to provide a $\Delta H_H/\Delta H_c$ ratio of less than 0.25 to the blend, or (e) up to 12% by weight of blend of a low molecular weight organic compound that is an ester, ketone, sulfone, sulfoxide, nitrile or amide of no more than 50 carbon atoms, provided the amount of the compound is sufficient to lower the Tpk of the blend by at least about 4° C.

Components (c), (d) and (e) may be present separately or in combination.

DESCRIPTION OF THE INVENTION

The Polyethylene Terephthalate

The polyethylene terephthalate employed herein is one which has an inherent viscosity of at least 0.4 dl/g as measured by ASTM D-2857. The polyethylene terephthalate preferably has an upper limit on inherent viscosity of about 1.2 dl/g. Inherent viscosity is measured in a 3:1 by volume ratio of methylene chloride and trifluoroacetic acid at 30° C. The polyethylene terephthalate can contain up to 10% by weight of a nonpolymeric comonomer or up to 3% by weight of a polymeric comonomer. Representative monomeric comonomers include diethylene glycol, butanediol, cyclohexane dimethanol, and other diols and glutaric acid and other dicarboxylic acids. By nonpolymeric is meant the comonomer does not contain more than two repeating units other than —CH$_2$—. By polymeric is meant the comonomer contains at least 3 repeating units other than —CH$_2$—. Representative polymeric comonomers include polyalkalene ether glycols. Preferably the polyethylene terephthalate is present in an amount between 35 and 99% and most preferably 35 and 70%, by weight of blend.

The Alkali-Metal Salt of a Substantially Aliphatic Polycarboxylic Acid

These salts increase the crystallization rates of polyethylene terephthalate resins, as indicated by the low ΔH ratios (explained further below), that the salts impart to the molding blend. The salts also tend to provide good mold release to polyethylene terephthalate resin blends.

These salts are present in the blends in an amount of between about 0.1-5 percent by weight, preferably between 0.35-1.1%, based on polyethylene terephthalate. The salts have at least 26 carbon atoms and preferably 30-54 carbon atoms. They have a molecular weight of less than about 1500, and preferably between 450-1000. The polycarboxylic acids used to prepare the salts must contain at least two and usually no more than six carboxyl groups per molecule. Preferably they contain 2 to 4 carboxyl groups, and most preferably only 2 such groups. Although both saturated and unsaturated polycarboxylic acids can be used to form the salt, saturated acids are preferred because they have less tendency to discolor. In addition, the acids may contain aryl moieties in the aliphatic chain, as for example, phenylene. Although any alkali metal can be used to form the salt, the preferred salts of the polycarboxylic acid are sodium and potassium salts, with sodium being especially preferred because of its atomic weight and its effectiveness in the present compositions.

Representative substantially aliphatic polycarboxylic acids that can be used to make the salts useful in this invention include heptacosanedioic acid, dimer acid, and trimer acid. By dimer acid is meant the $C_{36}$ dicarboxylic acid which is obtained by the dimerization of $C_{18}$ fatty acids. By trimer acid is meant the $C_{54}$ tricarboxylic acid which is obtained by the trimerization of $C_{18}$ fatty acids. Both unsaturated and saturated dimer and trimer acids are readily available. Availability coupled with effectiveness accounts for a preference for dimer and trimer acids and, particularly, for dimer acid. The commercial grades of dimer acid normally contain at least minor amounts of starting monocarboxylic acid and higher polymers, principally trimer acid. Likewise, commercial trimer acid normally contains traces of monocarboxylic acid and larger amounts of dimer acid. Obviously, mixtures of dimer and trimer acids can be used. It should be noted that other unsaturated monocarboxylic acids can also be dimerized or trimerized to form polycarboxylic acids of at least 26 carbon atoms which are useful in the present invention.

The salts of the polycarboxylic acid are readily prepared by adding a concentrated aqueous solution of the selected alkali metal hydroxide to a solution of the acid in an alcohol, such as methanol, and isolating the resulting salt of the acid by evaporation of alcohol and water. Preferably, equivalent amounts of hydroxide and acid are used. Excess hydroxide should be avoided. Preferably the degree of neutralization is 100%.

Other Additives

The amount of the salt present is an amount which will result in a $\Delta H_H/\Delta H_c$ ratio of the blend less than 0.25. To find the $\Delta H_H/\Delta H_c$ polyethylene terephthalate is molded at a mold cavity temperature of 70° C. into 1/16" thick bars. The bars are heated at a rate of 10° C. per minute and at between 95° C. and 120° C. an exotherm (termed $\Delta H_H$) is recorded on a differential scanning calorimeter (DSC) cell attached to a Du Pont 990 Differential Thermal Analysis (DTA) device. The bar is heated to 290° (which is above its melting point) and the melted sample cooled at 10° C./minute. Another exotherm at between about 200°–225° C. (termed $\Delta H_c$) is the exotherm recorded on freezing of the sample. It has been found that the $\Delta H_H/\Delta H_c$ ratio is a convenient method of measuring the degree of crystallization. The lower the $\Delta H$ ratio, the higher the degree of crystallization.

1. Reinforcing or Filler Material

The reinforcing or filler material which may be employed herein includes glass fibers, graphite fibers, aramid fibers, glass beads, aluminum silicate, asbestos, mica, and the like, and combinations of them. The material is preferably present in an amount of between 15 and 50 percent by weight of blend.

2. Ionic Hydrocarbon Copolymers

These copolymers can be employed as toughening agents. They also can aid in increasing crystallization rates, especially when employed with the low molecular weight compound described immediately below.

Representative ionic hydrocarbon copolymers are the salts of copolymers of olefins and acrylic or methacrylic acids, or copolymers of aromatic olefins and maleic anhydride. Preferably these materials include the sodium or potassium salt of ethylene/methacrylic acid copolymers (including both wholly or partially neutralized salts e.g., at least about 30% neutralized), the sodium salt of styrene/maleic anhydride copolymers (including both wholly or partially neutralized salts e.g., at least about 30% neutralized). In the copolymers listed above the olefin or aromatic olefin moiety ordinarily comprises 50–98 percent by weight of the copolymer, and preferably 80–98 percent. An especially preferred material is the sodium salt of ethylene/methacrylic acid copolymer. The copolymers may be prepared by conventional high pressure polymerization technology.

3. Low Molecular Weight Compounds

The compounds aid in improving crystallization rates, especially at low temperatures when employed with the ionic hydrocarbon copolymer and/or the alkali metal salts of the substantially aliphatic polycarboxylic acid.

Representative low molecular weight organic compounds are esters, or organic ketones, sulfones, sulfoxides, nitriles or amides of up to 50 carbon atoms. Preferably the organic ester is the product of an aromatic carboxylic acid of 7–11 carbon atoms containing at least 1 carboxyl group per aromatic nucleus, and an alcohol selected from those of the formula $(HOCH_2)_xR'$ wherein x is 1, 2 or 3 and R' is a hydrocarbon radical of 2–15 carbon atoms (preferably 2–10 carbon atoms) or those of the formula $HO-(R''O)_yR'''$ wherein y is a cardinal number between 1 and 15 and preferably between 1 and 8, R'' is a hydrocarbon radical of 2–15 carbon atoms (preferably 2–8 carbon atoms) and R''' is —H or a hydrocarbon radical of 2–20 carbon atoms (preferably 2–12 carbon atoms). Preferred organic esters are those in which the aromatic carboxylic acid and the aliphatic carboxylic acid are hydrocarbon acids containing 1–3 carboxyl groups and the alcohols are aliphatic. In other words, the R groups in the alcohols are alkyl or alkylene depending upon the particular R group. Preferably also when the carboxylic acids contain two or more carboxyl groups, the carboxyl groups are all reacted to form ester (COO) linkages, that is, there will be no free carboxyl groups present in the ester. Preferably, all the hydroxyl groups of the alcohols will also be reacted to form ester (COO) linkages, that is, there will be no free hydroxyl groups present in the ester.

A particularly preferred class of esters are those in which the acid is benzoic acid and the alcohol is $(HOCH_2)_2$—R' wherein R' is alkylene of 4–6 carbon atoms (preferably neopentyl glycol) or $HO(R''O)_yH$ wherein R'' is ethylene or propylene, and y is 2 or 3.

While the organic esters are preferred for use herein, other compounds which may be employed include
organic ketones of the formula

organic sulfones of the formula $R_2SO_2$,
organic sulfoxides of the formula $R_2SO$,
organic nitriles of the formula RCN, or
organic amides of the formula

or $RSO_2NR'R$ wherein each R can be the same as or different from any other R and a hydrocarbyl group of 1-25 carbon atoms, while R' is hydrogen or a hydrocarbyl group of 1-25 carbon atoms.

Preferred ketones, sulfones, sulfoxides, nitriles and amides are those in which the R groups in the formulas provided further above for these organic compounds are aryl groups of 6-10 carbon atoms or alkyl groups of 1-10 carbon atoms.

Specific compounds within these definitions are listed following: diphenyl carbonate, dibenzoate of neopentyl glycol, dibenzoate of triethylene glycol, dibenzoate of diethylene glycol, dibenzoate of dipropylene glycol, tris-2-ethyl hexyl trimellitate, butyl carbitol adipate, triethylene glycol caprate-caprylate, phenyl benzoate, pentaerythritol tetrabenzoate, trimethylolethane tribenzoate, dioctylphthalate, diisodecyl phthalate, benzophenone, 4-fluorobenzophenone, diphenyl sulfone, N-ethyl-o,p-toluene sulfonamide, tolyl sulfoxide, lauryl nitrile, and erucyl nitrile.

4. Combination of the Ionic Hydrocarbon Copolymer and Low Molecular Weight Compound These copolymers and low molecular weight organic compounds together are preferred for use in obtaining molded articles of high surface gloss at molding temperatures below 110° C. by increasing the rate of crystallization of polyethylene terephthalate. The ionic hydrocarbon copolymers are believed to primarily aid in increasing the rate of crystallization while the low molecular weight organic compound is believed to primarily improve the mobility of the polyethylene terephthalate in its melted state by reducing the viscosity of the polymer mixture. Both are necessary to obtain the high gloss found in articles molded at low molding temperatures.

The amount of the copolymer present in this combination is an amount which will result in a $\Delta H_H/\Delta H_c$ ratio of the blend less than 0.25. The $\Delta H$ ratio is discussed further above.

The Tpk of the blends is the temperature at which heat evolves most rapidly during the heating cycle recited in the previous paragraph. The amount of the low molecular weight compound present in the blend is an amount which lowers the Tpk of the blend by at least 4° C. over that of an identical blend that does not contain the compound.

5. Other Additives

In addition to the components discussed hereinabove, the blends of this invention may contain other additives commonly employed with polyester resins, such as colorants, antioxidants, other tougheners, ultraviolet light and heat stabilizers and the like.

Preparation

The blends of this invention are prepared by blending the components together by any convenient means to obtain an intimate blend. Neither temperature nor pressure are critical. For example, the polyethylene terephthalate can be mixed dry in any suitable blender or tumbler with the other components and the mixture melt-extruded. The extrudate can be chopped. If desired the reinforcing or filling agent can be omitted initially and added after the first melt extrusion, and the resulting mixture can then be melt extruded.

EXPERIMENTS

In the Experiments which follow, percents are based on total blend unless otherwise noted.

Properties of molded test bars were measured according to the following procedures:

Tensile strength and elongation were measured on injection molded bars by ASTM Method D638. Test bars were ⅛" ASTM-638-Type I bars.

Unnotched impact strength was measured by cutting 5×½×⅛" injection molded bars to the size specified for the Izod test in ASTM Method D256, but without notching the bars, and otherwise running the test by Izod method ASTM D256.

$\Delta H_H/\Delta H_c$ and Tpk are determined as described in published British application No. 2,015,014A.

EXAMPLE 1 AND CONTROL 1A

Two molding blends described below were prepared by shaking the ingredients together and then passing each blend through a two-stage, two-inch extruder in which the vacuum port was held at about 26 inches vacuum. The melt, which was at a temperature of about 300° C., was passed through a die to give a single strand which was cooled and cut.

The molding blends employed were:

Example 1 Blend 64.6% polyethylene terephthalate of inherent viscosity of 0.63 dl/g.

1% of the disodium salt of hydrogenated dimer acid (based on polyethylene terephthalate) (0.6% of total blend).

3.9% of the dibenzoate of neopentyl glycol.

0.6% of the epoxide formed from "Bisphenol" A and epichlorohydrin.

0.3% of tetrakis[methylene(3,5-di-tert-butyl-4-hydroxyhydrocinnamate)]methane (an antioxidant).

30% glass fibers with a diameter of 0.375 mils and an initial length before extrusion of 3/16-inch.

Control 1A Blend

Same as Example 1, except that it contained 1% sodium stearate based on polyethylene terephthalate instead of the disodium salt of hydrogenated dimer acid. Sodium stearate is a known crystallization-rate-increasing component.

The resin thus produced was dried in a vacuum oven for 18 hours at 120° C.

The blends were molded in a six-ounce injection molding machine. Molding conditions used to obtain physical properties were a fast ram, a 10-15 second forward time; a 15-second mold close time, a melt temperature of 300° C.; and a mold cavity temperature of about 110° C. 1/16" bars for determination of $\Delta H_H/\Delta H_c$ and Tpk were molded using a mold cavity temperature of 70° C.

Tensile strength, elongation, $\Delta H$ ratio and Tpk and were determined for the blends with the following results:

|  | Tensile Strength (kpsi) | Elongation (%) | $\Delta H_H/\Delta H_c$ | Tpk |
|---|---|---|---|---|
| Example 1 | 24.8 | 2.58 | 0.06 | 110.7° |
| Control A | 21.3 | 1.95 | 0.05 | 98.3° C. |

It is seen that in Control 1A (the blend containing sodium stearate) the $\Delta H_H/\Delta H_c$ and Tpk are acceptable, but the blend exhibits a pronounced deterioration in tensile strength and elongation.

EXAMPLE 2 and CONTROLS 2A, 2B and 2C

Four molding blends described below were prepared by shaking the ingredients together and then passing each blend through a two-stage, two-inch extruder in which the vacuum port was held at about 26 inches vacuum. The melt, which was at a temperature of about 300° C., was passed through a die to give a single strand which was cooled and cut.

The molding blends employed were:

Control 2A Blend 61.4% polyethylene terephthalate of inherent viscosity of 0.63 dl/g.

3.8% ethylene/methacrylic acid copolymer (85/15 by weight) which had been 60% neutralized with sodium.

3.9% of the dibenzoate of neopentyl glycol.

0.6% of the epoxide formed from "Bisphenol" A and epichlorohydrin.

0.3% of tetrakis[methylene-(3,5-di-tert-butyl-4-hydroxyhydrocinnamate)]methane (an antioxidant).

30% glass fibers with a diameter of 0.375 mils and an initial length before extrusion of ⅛-inch.

Control 2B Blend

Same as Control 2A, except that it also contained 0.6% disodium adipate. This meant, that the polyethylene terephthalate concentration was 60.8% instead of 61.4%. Tests on this blend described below show that a low molecular weight diacid salt such as disodium adipate is not as effective a mold release agent as the disodium salt used in Example 2.

Control 2C Blend

Same as Control A, except that it also contained 0.6% sodium stearate (a well known lubricant and mold release agent). This meant the polyethylene terephthalate concentration was 60.8%. Tests on this blend described below show that the monoacid sodium stearate decreases impact strength and is not as effective a mold release agent as the disodium salt used in Example 2.

Example 2 Blend

Same as Control 2A except that it also contained 0.6% of (the disodium salt of saturated dimer acid. This meant the polyethylene terephthalate concentration was 60.8%. Tests on this blend described below show that the disodium salt is effective as a mold release agent and does not cause a substantial reduction in impact strength.

The resins thus produced were dried in a vacuum oven for 18 hours at 120° C. prior to molding into test bars in a six-ounce injection molding machine. Molding conditions were a fast ram, a ten-second forward time; a fifteen-second mold close time, a melt temperature of about 320° and a mold temperature of about 110° C.

Tensile strength, elongation and unnotched impact strength were determined for the blends with the following results:

|  | Tensile Strength (kpsi) | Elongation (%) | Unnotched Impact (ft.-lbs/in) |
| --- | --- | --- | --- |
| Control 2A | 25.0 | 2.81 | 19.7 |
| Control 2B | 24.4 | 2.81 | 18.3 |
| Control 2C | 24.1 | 2.65 | 8.4 |
| Example 2 | 24.5 | 2.78 | 15.5 |

It is seen that Control 2C (the blend containing sodium stearate mold release agent), exhibits a pronounced deterioration in unnotched impact strength.

The blend of Example 2 and the blends of Controls 2A, 2B and 2C were injection molded as described above, but using a 5-second forward time, a 10-second mold close time, and an initial mold cavity temperature of 110°-120° C. which increased to 120°-140° C. during the course of the molding due to the heat input of the melt. The mold was a box mold having a part thickness of $1.3 \times 10^{-3}$ m. There are six knock-out pins on the bottom and six on the top edge. On removal from the mold, the following was observed:

Control 2A 8 articles were molded in the box mold. All 8 exhibited moderate to severe deformation from the knock out pieces.

Control 2B 6 articles were molded in the box mold, 5 exhibited moderate to severe deformation, 1 exhibited slight deformation.

Control 2C 21 articles were molded in the box mold, 17 exhibited moderate deformation, 4 exhibited slight deformation.

Example 2 37 articles were molded in the box mold, 2 exhibited moderate deformation, 14 exhibited slight deformation, 19 exhibited no deformation.

I claim:

1. A polyethylene terephthalate molding blend consisting essentially of:
   (a) polyethylene terephthalate which can contain up to 10% by weight of a nonpolymeric comonomer or up to 3% by weight of a polymeric comonomer, and which has an inherent viscosity of at least 0.4 dl/g; and
   (b) about 0.1–5% based on polyethylene terephthalate, of an alkali metal salt of a substantially aliphatic polycarboxylic acid containing between 30 and 54 carbon atoms and 2 to 4 carboxyl groups and having a molecular weight of less than about 1500, provided the amount of salt present is sufficient to provide a $\Delta H_H/\Delta H_c$ ratio of less than 0.25 to the blend.

2. The blend of claim 1 which contains, additionally, up to 60% by weight of blend of a reinforcing and/or filling material.

3. The blend of claim 1 which contains additionally, up to 12% by weight of blend of a sodium or potassium salt of an ionic hydrocarbon copolymer of an α-olefin of 2–5 carbon atoms and an α,β-ethylenically unsaturated carboxylic acid of 3–5 carbon atoms in which the carboxyl groups have been at least partially neutralized with Na+ or K+ cations, provided the amount of both copolymer and alkali metal salt of the substantially aliphatic polycarboxylic add present is sufficient to provide a $\Delta H_H/\Delta H_c$ ratio of less than 0.25 to the blend.

4. The blend of claim 1 which contains additionally, up to 12% by weight of blend of a low molecular weight organic compound that is an ester, ketone, sulfone, sulfoxide, nitrile or amide of up to 50 carbon atoms, provided the amount of the compound is sufficient to lower the Tpk of the blend by at least about 4° C.

5. The blend of claim 1 which contains additionally,
   (c) up to 60% by weight of blend of a reinforcing or filling material,
   (d) up to 12% by weight of blend of a sodium or potassium salt of an ionic hydrocarbon copolymer of an α-olefin of 2–5 carbon atoms and an α,β-ethylenically unsaturated carboxylic acid of 3–5 carbon atoms in which the carboxyl groups have been at least partially neutralized with Na+ or K+ cations, provided the amount of both copolymer and alkali metal salt of the substantially aliphatic polycarboxylic acid present is sufficient to provide a $\Delta H_H/\Delta H_c$ ratio of less than 0.25 to the blend,
   (e) up to 12% by weight of blend of a low molecular weight organic compound that is an ester, ketone, sulfone, sulfoxide, nitrile or amide of up to 50 carbon atoms, provided the amount of the compound is sufficient to lower the Tpk of the blend by at least about 4° C.

6. The blends of claims 1, 2, 3, 4 or 5 wherein component (b) is the disodium salt of hydrogenated dimer acid.

7. Process for preparing the blend of claim 1 which comprises mixing the components of the blend and then melt-extruding the mixture.

8. Process for preparing a molded article which comprises melting a blend of claim 1, placing the melted blend into a mold, and then allowing the blend to solidify.

* * * * *